(12) United States Patent
Rietschel et al.

(10) Patent No.: US 7,710,941 B2
(45) Date of Patent: May 4, 2010

(54) METHOD AND DEVICE FOR THE SYNCHRONISED RESTITUTION OF DATA FLOWS

(75) Inventors: Johannes Rietschel, Zurich (CH); Silvan Sauter, St. Gallen (CH); Reto Staheli, Wil (CH)

(73) Assignee: Barix AG, Zürich (CH)

( * ) Notice: Subject to any disclaimer, the term of this patent is extended or adjusted under 35 U.S.C. 154(b) by 1365 days.

(21) Appl. No.: 10/533,795

(22) PCT Filed: Nov. 4, 2003

(86) PCT No.: PCT/CH03/00720

§ 371 (c)(1),
(2), (4) Date: May 4, 2005

(87) PCT Pub. No.: WO2004/043032

PCT Pub. Date: May 21, 2004

(65) Prior Publication Data

US 2006/0013208 A1    Jan. 19, 2006

(30) Foreign Application Priority Data

Nov. 6, 2002    (CH) ...................................... 1861/02

(51) Int. Cl.
*H04J 3/06*    (2006.01)
(52) U.S. Cl. .................. 370/350; 370/395.46; 370/503; 386/66
(58) Field of Classification Search ................. 370/350, 370/395.64, 503; 386/66
See application file for complete search history.

(56) References Cited

U.S. PATENT DOCUMENTS 5,408,506 A * 4/1995 Mincher et al. ............. 375/134

(Continued)

FOREIGN PATENT DOCUMENTS

WO    02/076149    9/2002

(Continued)

OTHER PUBLICATIONS

Xie, Y et al: "Adaptive Multimedia Synchronization in a Teleconference System" 1996 IEEE International Conference on Communications (ICC). Converging Technologies for Tomorrow's Applications. vol. 3, pp. 1355-1359, Jun. 23, 1996. XP000625031.

(Continued)

*Primary Examiner*—Robert W Wilson
(74) *Attorney, Agent, or Firm*—Oblon, Spivak, McClelland, Maier & Neustadt, L.L.P.

(57) ABSTRACT

A method for restitution of data flows or data packets transmitted over a network, using at least two restitution appliances that are at least indirectly connected to the network, for a synchronized and error-free restitution. To synchronize the restitution by the at least two restitution appliances, either one of the restitution appliances, as the master, provides its internal clock as the reference, and the other restitution appliances, as the slaves, coordinate their internal clock with that of the master by the network and restitute the data flows or data packets according to the coordinated clock, or the internal clock of an external appliance also available on the network is used as the master, and all restitution appliances, as the slaves, co-ordinate their internal clock with that of the master by the network, and restitute the data flows or data packets according to the coordinated clock.

25 Claims, 2 Drawing Sheets

U.S. PATENT DOCUMENTS

| | | | |
|---|---|---|---|
| 6,072,879 A | 6/2000 | Ouchi et al. | |
| 6,091,826 A | 7/2000 | Laitinen et al. | |
| 6,353,169 B1* | 3/2002 | Juszkiewicz et al. | 84/600 |
| 6,377,979 B1* | 4/2002 | Yamashita et al. | 709/213 |
| 7,068,746 B1* | 6/2006 | Stichter | 375/356 |
| 7,089,333 B2* | 8/2006 | Marinescu et al. | 709/248 |
| 7,133,936 B2* | 11/2006 | Katta et al. | 709/251 |
| 2002/0025777 A1* | 2/2002 | Kawamata et al. | 455/3.05 |
| 2004/0063459 A1* | 4/2004 | Yamashita et al. | 455/556.1 |
| 2004/0114607 A1* | 6/2004 | Shay et al. | 370/395.42 |

FOREIGN PATENT DOCUMENTS

| | | |
|---|---|---|
| WO | 03/023759 | 3/2003 |

OTHER PUBLICATIONS

Newmarch, Jan: "A Networked loudspeaker" NN, [Online], pp. 1-9, Jul. 19, 2002. XP002241563.

* cited by examiner

METHOD AND DEVICE FOR THE SYNCHRONISED RESTITUTION OF DATA FLOWS

TECHNICAL FIELD

The present invention relates to a method for reproducing data streams or data packets transmitted via at least one network using at least two reproduction units which are at least indirectly linked to the network. It also relates to a data processing program for carrying out such a method and to an apparatus for carrying out such a method.

PRIOR ART

The transmission of digitally stored, multimedia data streams via a network infrastructure, the storage of these streams on computer-like equipment and their reproduction in professional applications and also in the home are already omnipresent. This is particularly so in the audio sector, since the data rates and volumes required for transmission and storage have been able to be severely reduced on account of effective compression methods (MP3). In the video sector, great efforts are being made by many to improve compression methods (MPEG-4) ever more in order to make the "online" availability and, by way of example, the real-time retrieval of feature films using an ordinary infrastructure (ADSL, wire modem and PC) a possibility in this case too. In the home, a very large market would develop if audio data could be output with very precise synchronization, without loss of quality, i.e. digitally with error correction, and in a form distributed using various media, but particularly by radio. Previously known methods (e.g. analog modulation of the data onto RF carriers without a reverse channel) are neither high in quality nor secure in operation. Reliable systems which, by way of example, can also distribute an S/PDIF (Sony/Philips Digital Interface, digital audio output) or analog audio signals reliably (i.e. with a reverse channel) using a wired or wireless infrastructure without noticeable loss of quality have not been available to date.

ILLUSTRATION OF THE INVENTION

The invention is accordingly based on the object of providing a method which allows data streams or data packets transmitted via at least one network to be reproduced in error-free and synchronized fashion using at least two reproduction units which are at least indirectly linked to the network.

To achieve this object, the reproduction using the at least two reproduction units is synchronized either by virtue of one of the reproduction units, as master, prescribing its internal clock as reference and the other reproduction units, as slaves, aligning their internal clock with that of the master via the network and reproducing data streams or data packets on the basis of this aligned clock, or by virtue of the internal clock of an external unit which is likewise available on the network being used as master and all reproduction units, as slaves, aligning their internal clock with that of the master via the network and reproducing data streams or data packets on the basis of this aligned clock.

The essence of the invention thus involves ensuring that the individual reproduction units are synchronized by defining a reference clock. In this context, the term clock is not intended to be understood in the exact sense, but rather simply in the sense of a timing reference system within which all stations in the system, i.e. master and slave, are in sync. In other words, it may be that the clock mentioned in this instance absolutely does not correspond to the actual time while its speed of operation differs from the speed of operation of a clock, too. The only matter of importance is that the individual stations operate together in an identical, synchronized time system. In other words, the slaves may simply have a clock which is in sync with the master or may have a synchronously operating reference system for reproducing the data, which clock or which reference system does not need to be identical to the actual clock which is available on the slave. To a certain extent, the slaves then carry a separate copy of the master clock. The synchronization which is fundamental within the context of this invention thus does not primarily aim to be able to ensure "realtime" conditions but rather aims to ensure the highest possible level of data integrity, with the moment of playback not being of greatest significance, but rather just the relative synchronization. A fundamental factor in the proposed synchronization system is that it is not the master which has the task of keeping the individual slaves in time, but rather the individual slaves which independently have responsibility for aligning themselves with the master and effect this independently. This results in the advantage that the master does not necessarily need to be informed about what kind of other stations are currently operating together in sync in the network. This significantly simplifies the management of a system. The master merely makes its clock available and the master itself does not modify this reference system, however much it may differ from an actual time.

In line with a first preferred embodiment of the present invention, the network is a network in which data packets are transmitted asynchronously. The synchronization of data streams is relevant particularly if the network is nondeterministic, i.e. if the data are sent asynchronously. In an asynchronous network, it cannot be assumed that data always require the same time from point A to point B. In addition, the data are not sent at a constant clock rate. Accordingly, data in such a network will inherently arrive at the reproduction units at different times via different paths (e.g. via switches or routers), which makes synchronization particularly important.

In line with a further preferred embodiment, the clock in the slave is aligned not only before reproduction for the first time when turning on or switching in the slave, but rather also periodically during the reproduction of the data. This update is important particularly in the case of long, cohesive data streams, since even very small differences in the speed of operation of the internal clock of the master and slave can result in a large difference over a relatively long time. Typically, such resynchronization takes place every 30 seconds. Preferably, the periodic update is used on the slave for systematically matching the speed of operation of the internal clock in the slave to that of the master in order to compensate for differences in the internal propagation-time characteristics of master and slave. Such systematic matching, which to a certain extent allows "pulling" between slave and master, is similar to that in the field of aligning conventional clocks on networks (ntp, Network Time Protocol). This ensures the smoothest possible matching between the time systems of the master and slave, and prevents data packets from being omitted or gaps being inserted on the slave, for example, to compensate for propagation-time differences in the event of a mismatch. Nevertheless, if there are large time differences (typically above 100 ms, for example, in the audio sector)—although these are typical only when the data transmission is a problem—it may become necessary for the reproduction on the slave to be effected by means of such graduated action.

Typically, systematic matching involves scaling the internal clock of the slave or the speed of operation of said clock using a constant correction factor.

The internal clock on the slave can be aligned in various ways. Of particular importance in this context is that it is not a simple matter of requesting the time on the master and then using it on the slave as it is after it has been transmitted, but rather account is taken of the fact that transmitting or requesting the time via the network has likewise taken up a certain time. Since the timing accuracy required particularly within the context of this invention is in the area of such typical transmission times in networks, account should be taken of this fact. Preferably, the procedure in this case is accordingly such that the internal clock in the master is requested by the slave, particularly preferably a plurality of times, and by virtue of at least one, preferably a plurality of data packets, which may be identical to the packets for requesting the time on the master, being transmitted from the slave to the master and being sent back, and the internal clock in the slave is brought into line with the clock in the master on the basis of a propagation time, particularly an average propagation time, for data packets between master and slave. In other words, a plurality of requests are used to ascertain a mean data propagation time which is typical of the specific network, and only when this typical data propagation time is known is the time on the slave adjusted taking it into account. In this case, however, it is not normally just the data propagation time via the network which is significant, but rather also handling times in the units. Accordingly, in addition to taking account of the propagation time, the mean value taken into account should be handling times in the units, normally as an additional constant additive contribution.

When such a system of reproduction units is started up, it is important to define a master in good time so that the individual reproduction units do not all reciprocally attempt to align themselves relative to one another. In line with one preferred embodiment of the invention, this is advantageously done such that the first reproduction unit which has the task of reproduction is automatically defined as master. The procedure in this case is typically such that a unit, having been requested to effect reproduction, initially understands itself simply to be a potential master but does not start any actions which are typical of a master. At the instant at which it receives a request from another reproduction unit to make the data stream being played back available, the unit becomes the master. The requesting unit automatically becomes the slave. It goes without saying that it is also possible to define a unit as a master, but this solution has the drawback that if this master is ever not intended to be operated for whatever reasons or fails then the system is in an undefined state. Correspondingly, it should also be stated in the protocol that if the present master fails or is turned off, the first unit implementing this automatically defines itself as the new master in the network and immediately undertakes the task as the master.

The proposed method is preferably used in the field of digital audio or video data or a combination thereof. With particular preference, the data or data streams are accordingly compressed or uncompressed audio files such as MP3, WAV, MPEG, Windows Media etc. In principle, the reproduction may either be "multiroom" reproduction, i.e. reproduction of identical media—particularly audio files—in synchronized fashion, or else "multichannel" reproduction, in which the different channels are reproduced on different reproduction units, particularly in the case of audio files in stereo format or multichannel formats, such as dolby 5.1, DTS etc.

In line with a further preferred embodiment of the present invention, at least some of the data streams or data packets are temporarily buffered in the reproduction units before reproduction, with audio files typically involving buffering in the range of approximately 1 to 5 sec. Preferably and with great advantage, e.g. in the case of realtime voice applications, the buffering is performed dynamically and so as to be matched to the circumstances of the network. The smaller the buffers, the shorter the latency for which it is necessary to wait before a stream can be played. Accordingly, it is advantageous to use the smallest possible buffers. The higher the quality of the network used, the smaller the buffers can be made, since in this case fewer failures occur and accordingly also fewer repetitions are necessary. Dynamic allocation of the buffer takes optimum account of this circumstance and can accordingly be used to optimize the latency. This buffering, which preferably takes place in a "ring buffer", firstly permits accurate synchronization, because the output pointer on the master and on the slave is simply set to be the same, and secondly this also makes correction mechanisms ("retry protocols") much more easily possible, which is of great significance within the context of the data integrity that is the aim here.

Particularly within the context of the output of audio files, it is found to be advantageous to design the synchronization of the individual reproduction units to be in the range below 100 ms. Preferably, the propagation-time differences should be less than 10 ms or less than 2 ms, particularly preferably less than 1 ms. From psychoacoustics, it is known that normal hearing is capable of perceiving relatively large propagation-time differences of greater than 30 ms as echo, which is precisely what needs to be prevented within the context of this invention. It is found that in the aforementioned "multichannel" mode, too, an accuracy in the range of 1 ms is sufficient. The synchronization of data streams to this accuracy can no longer be assured in a typical network without active synchronization of the individual reproduction units, and in particular it is not possible simply to switch in further stations without active synchronization. Typically, the network is a conventional, wired network, but it may preferably also be a wireless network, particularly a radio network (e.g. Wifi, wireless fidelity, also called IEEE802.11b, or follow-up standards at a higher data rate, such as IEEE802.11a). If as proposed in line with another preferred embodiment of the present invention, it is necessary to switch in a further reproduction unit synchronously, then this is preferably done by virtue of the unit which has been switched in automatically aligning itself with the present master and starting reproduction itself after buffering some of the data. Similarly, it is sometimes found to be very advantageous to be able to set the delay of a client in specific fashion relative to the master. This means that large spaces, churches etc. can be supplied with data much better acoustically and can compensate for acoustic properties/propagation times in these buildings. This then involves a deliberate, i.e. desired and systematic, delay, however. The time shift used for this when reproducing on different units is set to be constant and remains synchronized.

Various data sources may be suitable as data sources for the master. The data packets or data streams may either be fetched from or sent by a separate data server, or fetched on or sent by one of the reproduction units, or may already be available on the reproduction units, or may be made available to the system in digital form via an analog/digital converter after supply in analog form.

A further preferred embodiment is characterized in that the data packets or data streams are read from a data source into a ring buffer in the master, with each byte read in being provided with a unique address (simply a 32-bit counter, starting at 0), and in that, in a process which is independent of the data stream's being read into the ring buffer, the master sends the data to the network from the ring buffer in blocks, particularly straight after reading in, by broadcast, particularly by UDP broadcast, and also particularly by multicast, with the addition of a protocol header which contains, inter alia, the address of the first byte sent, the precise master time and the address of the next byte which is to be sent by the master to the codec of the master. In principle, the data can be forwarded from the master to the slaves in different ways. The simplest approach is a "unicast", i.e. the master sends the data separately to each further slave. When a plurality are present, however, this even results in unnecessary loading of the network. Accordingly, the distribution should preferably be performed in optimized fashion such that the master forwards the data to all further reproduction units using a multicast. The required bandwidth thus remains largely constant regardless of the number of slaves (only any further synchronization packets are added for the time alignment, which take up virtually no bandwidth). The output pointer, or its position on the master, is transferred to the slaves as the address of the next byte which is to be sent to the master's codec by the master. In this case, it is assumed that the master and slave have similar architectures, in which the time period between actuation of the codec and effective output at the audio output (loudspeaker) is as good as identical. If this is not the case, appropriate corrections need to be taken into account (e.g. necessary in the event of significant gain delays in one of the output units etc.) As mentioned, the position of the output pointer on the master can easily be sent as header with the actual data packets. Alternatively or in addition, however, it is also possible to send the address of the next byte which is to be sent to the master's codec by the master in independent control blocks, which may be identical to the control blocks for checking the clock on the master, at least to some extent. In this context, it is also necessary, in particular, to include the propagation time of the packet, using the average propagation time or the propagation time sent by the server, and possibly to correct the counter accordingly.

As already mentioned further above, the integrity of the data is very significant in connection with the present invention. It is clear that unidirectional methods (such as analog or digital transmission without reverse channel/acknowledgement, such as the aforementioned multicast/broadcast) are not adequate if the aim is to achieve transmission which is as loss-free as possible, and a bidirectional communication method with data buffering needs to be chosen to allow, in the event of temporary data loss, a repetition to be requested and a fresh transmission to be performed before the local buffers containing previously transmitted data become empty. Accordingly, a correction mechanism or else "retry protocol" is preferably provided which can be used to correct lost or damaged data packets on the slaves. Accordingly, to protect the data integrity when a slave establishes that a data portion has been lost on the network, this data portion is sent again by the master upon a request from the slave. This is now not done directly after the request, but instead the master performs this repeat transmission only after a delay. Typically, this delay is a few ms. The reason for this is that normally an incorrect transmission is sensed in a network by a plurality of slaves at the same time. Accordingly, a plurality of slaves will also send a request to the master. The slaves are now programmed such that they send the requests in staggered fashion (this may be based on a programmed time scheme or else in line with randomly generated time differences between the requests). If the master now waits with its appropriate correction data transmission until all of the slaves which have detected an incorrect input have sent their request, then it is possible to prevent identical requests from being sent over the network a plurality of times.

In addition, the procedure is preferably such that a slave sends a retry request only if it has not observed a particular number (at least one) of identical requests from other reproduction units or slaves in the network. This is equivalent to one repetition (performed once by a plurality of units) and ensures a higher level of data integrity. In addition, the slave preferably sends such retry requests only when or only if it is certain of the fact that the requested data packet is still being sent by the master in good time and can then be played back by the slave. This is because if this condition is no longer met, the slave needs to resynchronize to the data stream anyway, since its buffer becomes empty before the required data can be provided by the master. If retry requests continue to be sent without taking this condition into account, an unnecessary load on the network is the result.

Alternatively, and particularly in the case of short missing data sections, it is possible, in a situation of this type, i.e. when the slave establishes that its stock of data is inadequate for continuous reproduction, not to break off and resynchronize to the data stream, but rather to fade reproduction briefly in that time period in which the data are not available (hole in the buffer).

After the waiting time, the master sends the appropriate correction data packet to the network again using a broadcast or multicast, and all of the slaves which need this packet can incorporate it into their ring buffer. In addition, the slaves should monitor the network to determine whether correction requests such as they currently intend to send have already been sent to the master. If this is the case, the slave does not make a further request, since the correction packet in question will be provided by the master in a multicast anyway.

A further improvement in the coordination and particularly in the control between master and reproduction units or slaves can be achieved by using the data streams or data packets to send at least one command to the reproduction units together with an associated execution time. By way of example, it is possible to transfer commands such as Pause, Play, Stop etc. in this context. Preferably, the execution time should be chosen such that at least the longest network delay time established in the network between the master and the reproduction unit can elapse between the transfer of the command to the network and the execution time. It is thus possible to ensure that when the command arrives at the respective reproduction unit the execution time is not yet in the past.

This maximum network delay time can be ascertained from time to time by the master, for example, and can then be stored. Typically, for the sake of security, this maximum network delay time can have an additional contribution added to it, for example in the range from 1-20 ms. This additional contribution serves to cover the network transmission tolerance (safety margin) and the processing time in the transmitter and receiver. This maximum network delay time should be adapted dynamically, since this maximum network delay time can change greatly on account of alterations in the network. This characteristic time thus changes, for example when the load on the network rises (typically an increase in the maximum network delay time), or when further reproduction units or other units are switched in or disconnected.

To avoid the time-consuming ascertainment of the bit rate at which the master provides the data streams or data packets on the network and which the reproduction unit requires in order to calculate the delays which arise in the network, this bit rate can be sent straight away in the data streams or data packets from the master.

Preferably, if a reproduction unit needs to be freshly connected to a stream which is already flowing (for example when a unit is switched in afresh or when a loss of data has resulted in the buffer becoming irreparably empty despite a retry request), then the procedure is such that a reproduction unit which has been switched in transfers the data streams or data packets received from the network to its codec directly, i.e. from the first byte which is received onward. The reproduction unit's codec first of all rejects the supplied data by muting until a first valid frame is detected. The codec is then stopped and the current byte (which does not necessarily need to be the first byte in the frame in question) is noted. At the instant at which this current byte is played on the master, the codec in the reproduction unit is then connected again and processes the data stream or the data packets to reproduce them. If the stream to the codec is stopped after the first valid frame is reached and then reproduction (streaming) needs to be started at the same time as the master, it must be remembered that the buffer in the codec of the reproduction unit (slave) is not full at this instant, i.e. is half empty, for example.

This means that the data are sent much more quickly to the codec at the beginning because the codec always wishes to have its buffer as full as possible as well. Accordingly, reproduction (streaming) needs to be started a little later, since the slave then catches up with the master as a result of the faster filling, of course.

By waiting for the first valid frame in the codec in this way, it is possible to avoid the generally slower processor in the reproduction unit needing to parse, i.e. analyze and split, the stream, i.e. the data stream or the data packets, and the codec being used to synchronize to the stream. If the master starts a new stream, such a method is typically not required.

The proposed method also allows tree structures to be operated. Such cascaded synchronization can be achieved by virtue of at least one of the reproduction units being used, for its part, as master for a subnetwork (e.g. LAN). Preferably, corresponding repetitions are then forwarded to the topmost master (root master). It is thus possible to synchronize as many reproduction units as desired, and each of the reproduction units can for its part be used as a repeater (reproduction unit which is active both as a slave and as a master). In principle, it is thus also possible to have a slave which is acting as a master in this fashion sent to another network. For the root master, the result is then altered maximum network delay times, of course, which then need to be taken into account accordingly. This allows the data stream to be replicated very efficiently and possibly extensively.

In this case, at least one of the reproduction units may advantageously have a memory which provides audio data. This memory may be a drive (CD, DVD or the like), for example, in which a medium containing appropriately written information is provided. Alternatively, the memory may be an internally writable or read-only memory. This memory is used as a source for audio data.

The content of these audio data may possibly be obtained from the master or from another data source (a tuner for receiving radio input is also conceivable).

Further preferred embodiments of the inventive method are described in the dependent claims.

The present invention also relates to a data processing program for carrying out a method, as is described above, and to a reproduction unit for carrying out such a method. In this context, the reproduction unit preferably has a network interface (or more generally a communication interface), a central computer unit with a memory, and means for at least indirectly outputting analog or digital data, particularly in the form of a loudspeaker. The memory of such a reproduction unit contains a permanently programmed data processing program for carrying out this method, and this program is activated automatically after the power supply is turned on, with the reproduction unit particularly preferably having means for automatically integrating the unit into the network.

Further preferred embodiments are described in the dependent claims.

BRIEF EXPLANATION OF THE FIGURES

The invention will be explained in more detail below using exemplary embodiments in conjunction with the drawings, in which.

WAYS OF IMPLEMENTING THE INVENTION

As an exemplary embodiment of the present invention, a system will be described in which a "transmission unit" distributes a continuous data stream delivered by a (digital or analog) audio data source wirelessly over a plurality of distributed reproduction units (typically active loudspeakers), with the latter decoding and outputting various channels of the same data stream. To this end, the transmitter unit has a CPU, i.e. a processor, buffer store, and at least one bidirectional communication interface, in the example described an 802.11b radio network interface, and an audio input for analog or digital audio data and also its own audio output (that is to say that it is also a reproduction unit). The other reproduction units use the same architecture, but instead of an audio input have a digital and/or analog audio output and possibly power amplifiers and sound transducers/loudspeakers 13.

The description which now follows uses designations which will be defined as follows:

The server is a data source for audio data and may be any unit for providing the data. In this context, it may be a server belonging to a content provider, for example, or else a simple music or video server. In particular, a digital input circuit (e.g. S/PDIF), an analog/digital converter and/or a codec, which compresses/codes a data stream (typically a digital signal processor), may also be regarded as a "server".

Reproduction unit: a unit for reproducing the media stream which (unit) supports the protocols described here.

Master: a reproduction unit which has received from another unit a request to forward the data stream which is currently being played.

System: a set of at least two reproduction units which are installed in a common communication structure.

Slave: a station which has been requested by user interface or command or permanent setting/parameterization to play in sync with another reproduction unit ("master").

A plurality of slaves can play back the same data stream in sync. For this reason, the slaves are provided with numbers to identify them.

Normal Mode without Synchronization:

All reproduction units operate autonomously. The reproduction units can all independently output media data from a common data source or from different data sources. In this context, the data sources may be arranged in the network, or else they may be data already stored on the reproduction units.

Automatic Identification of and Searching for Stations:

Each reproduction unit contains a "discovery server" which, upon the arrival of a particular network block (UDP datagram for a specific port number; UDP is a standard, low-overhead, connectionless, host-to-host protocol which allows data packets to be interchanged over switched computer networks. It allows a program on a computer to send a datagram to a program on another computer), reacts with a response block. Alternatively, it is possible to use other discovery protocols, for example SSDP (Simple Service Discovery Protocol, a subprotocol of UPNP; Universal Plug and Play is a standard which is used to permit direct and automatic linking of peripheral devices in a local network without configuration).

Using the search protocol, each reproduction unit obtains a list of other reproduction units, their configured names, if available, and their network addresses (IP address). This search is repeated again and again, so that additions to the list as a result of newly added units are made automatically. Units which are no longer available are removed from the list again after a particular time.

A piece of software organized in the form of a home page, for example, then allows all the reproduction units which are in a network to be made visible by means of a request on a specific reproduction unit within the network. This requires no installation involvement, the software in question automatically shows all of the stations and makes it possible to link individual stations to others in synchronized fashion (e.g. by triggering via cgi command). This ensures simple handling.

Request for Synchronization:

A station can be stimulated by various influences to synchronize itself to another unit and reproduce its media stream:
1. By means of fixed configuration ("setup"). Such a station constantly attempts to synchronize itself to the configured master.
2. By means of a command from an application (e.g. by cgi command, cf. above).
3. By receiving a command via UDP—the case "ALL synchronizing to station xxxx" is also feasible.
4. By means of an action by the user and triggering via user interface.

When one station is stimulated to synchronize itself to another, the following happens:

Time Synchronization:

Slave units need to synchronize themselves to the master very accurately. This requires accurate synchronization of a common time base. It is not necessary for this "master/slave system time" to bear any relation to another systems, such as world time, and the accuracy (speed of operation) of this time is also unimportant—provided that both units operate as synchronously as possible.

The time synchronization of the reproduction units needs to be repeated periodically in order to correct discrepancies over time. In this case, the sequence of time synchronization takes place in similar fashion to a protocol which is known from the field of time alignment, namely ntp (network time protocol). This involves a protocol for synchronizing the clocks on computers in a network.

In the present case, the procedure is as follows:

The approach used is to request the time from the server taking into account the average propagation time for the data. The unit itself takes its current time and measures the time taken for the response from the server. This response contains the current server time at the time at which the request arrives. If this operation is carried out a number of times, slight fluctuations in the data propagation times can be compensated for:
a) Slave sends UDP datagram to the station to which it wishes to be synchronized, and requests the current time thereon. The telegram indicates its "own" time (transmission time).
b) The telegram is provided with the local (master) time by the receiver, the "slave" transmission time being maintained, and is returned to the slave.
c) The slave receives the telegram returned by the master and enters it into a table, with the reception time being noted.
d) Steps a-c take place a plurality of times (e.g. at least 8× in the case of first synchronization, 3× in the case of resynchronization), with the aim of obtaining as accurate a result as possible through averaging by omitting extreme values.
e) If the table contains sufficiently meaningful data, evaluation takes place. To this end, the difference (current slave time minus slave transmission time) is formed for each telegram and a check is performed to determine whether the telegram was in transit for a long time (large difference) . Only the telegrams with the smallest difference are taken, and it can normally be assumed that if the units are the same then the transmission time is divided up approximately symmetrically over the two transmission paths. This means that a "master time" which is independent of the normal slave time can be synchronized to the master very accurately in the slave.

On a normal Ethernet and even on 802.11 wireless networks, the transmission times in the unloaded state are typically below 1 ms, in any case below 5 ms, and when the "symmetrical" delay is assumed the time synchronization of the stations can be assured to be significantly below 1 ms using the method described.

Hence, an average propagation time for the data is ascertained within as short a time period as possible. Deducting an estimated or empirically ascertained constant of 0.01-1 ms for the different processing time when transmitting and receiving the data within the units, an instantaneous propagation time is now obtained for a data packet. This propagation time is now taken into account when ascertaining the current system time.

The time synchronization is then repeated at regular intervals, typically every 30 seconds, with a time stamp in the forwarding protocol generally sufficing for monitoring, and hence the resynchronization being triggered only if there are significant discrepancies.

Data Synchronization:

General: to synchronize "N" slaves to a master without an "N"-fold volume of data on the network, it is advantageous, while aiming to have the lowest possible required bandwidth on the network, to distribute the streaming data from the master by multicast/broadcast. Broadcast/multicast is not "safe", i.e. data can be lost. A repetition mechanism is therefore required. Repetitions can be requested unidirectionally—with direct addressing.

To set up a plurality of independent synchronization groups (channels) simply and automatically, a different port number should be used per channel for the data distribution. This provides a high level of probability of ensuring that in the implementation described each station derives an individual port number from its IP address and from a constant. The last 12 bits of the IP address plus a constant (e.g. 40 000) are added. Such a port number is guaranteed to be unique in a typical network with class C addressing.

The individual port number of each station is sent concurrently in the case of the "discovery" protocol, and each station therefore knows the "channel number" of every potential master.

Registration: when the time synchronization has been set up (see above), the slave asks the reproduction unit whose data stream it wishes to reproduce in synchronized fashion to adopt the "master" role. This is done by sending a command (SYNC_REQ) to the (master)-specific UDP port/channel. Acknowledgement by the master confirms receipt of the command, and if there is no acknowledgement then the slave repeats the command, if necessary a plurality of times.

Streaming: the master receives the streaming data, e.g. from a server, typically by tcp connection, possibly by http, or else from a local digital or analog interface, codec or the like. The operation of the system is totally independent of the data source used. All incoming data are written to a ring buffer. Whenever a stream "starts", a byte counter (32 bits) is reset. Each incoming byte from the server is counted and thus has a unique "address".

Figure 1:
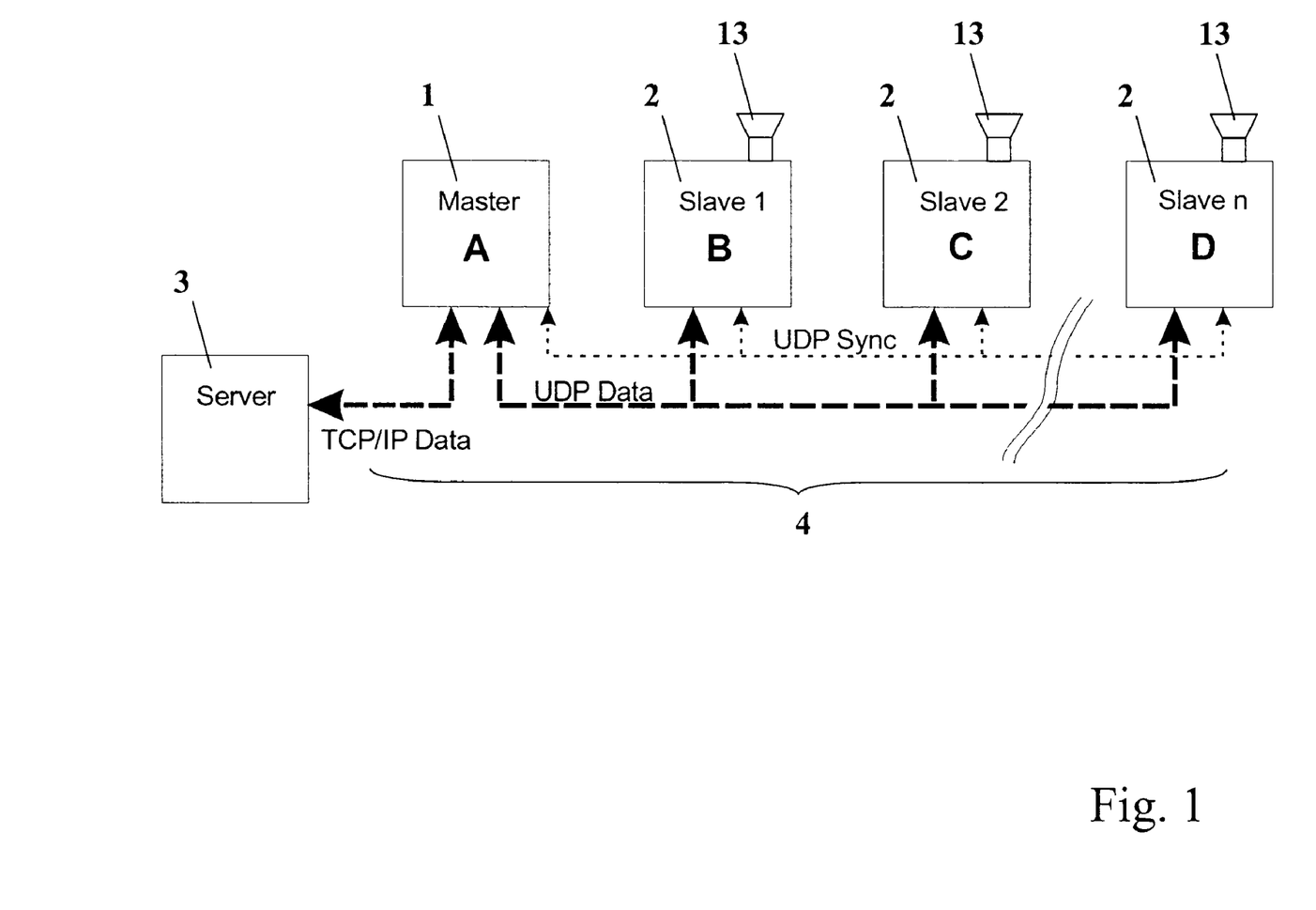
FIG. 1 shows a schematic illustration of a system with synchronized reproduction units.
Figure 2:
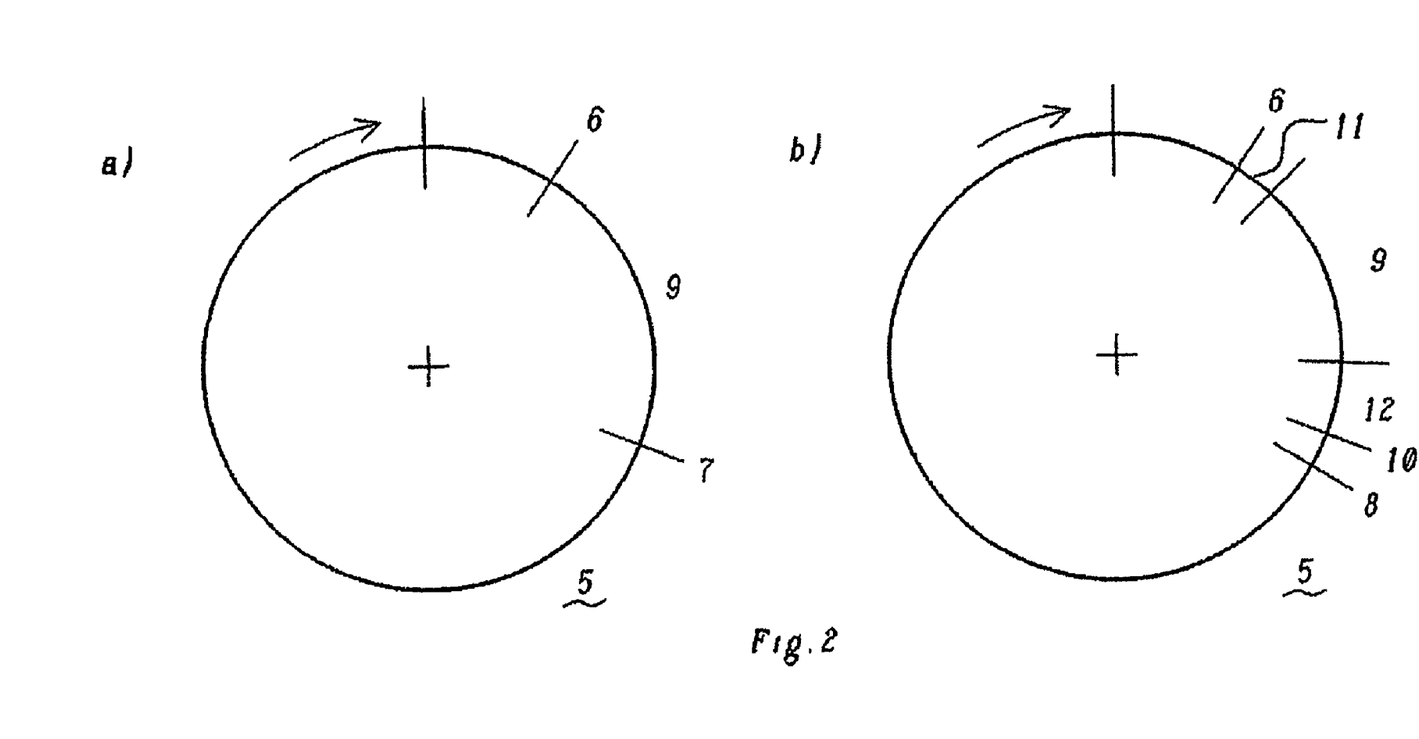
FIG. 2 shows a) a schematic illustration of the ring buffer on a slave and b) a schematic illustration of the ring buffer on a master.

In a process which is independent of receipt of the tcp stream, the master sends the data from the ring buffer in blocks, immediately after they arrive, by UDP broadcast to the network, supplemented by a protocol header, which inter alia contains the "address" of the first byte sent, the exact master time, the address of the next byte which is to be sent to the codec by the master etc. This is shown in FIG. 2b). The ring buffer 5 is constantly filled with data. The output pointer 6 is at a particular location and sends the data read there to the local codec/converter for reproduction. The output pointer 6 moves forward (cf. direction of arrow) in line with the internal clock of the master. The data input pointer 8 indicates that position at which the data received from a server are currently being read into the ring buffer 5. Essentially directly "behind it" in the reading direction is the data forwarding pointer 10, which indicates the position at which the data which the ring buffer 5 contains are forwarded from the master to the slaves via a multicast/broadcast. In this case, the reference symbol 12 indicates a typical data packet. The ring memory 5 accordingly contains a "stock of data" 9, the fundamental part of which is available for any "retry protocols" which may be required (cf. below). Typically, this stock of data comprises between approximately 1 and 4 seconds of data. The safety area directly before the output pointer 6 is no longer available for correction protocols, since the output pointer can no longer be transferred in appropriate fashion.

The slave receives these datagrams and itself enters the received data into a ring buffer 5. The protocol header is evaluated directly, specifically by virtue of the master time being checked for accuracy and the information "master time/current byte" (which is the current moment of playback) being temporarily buffered or used to move the output pointer 6 to a correct location or to adjust the latter's operating characteristics. The ring buffer 5 of the slave is shown in FIG. 2a). The data input pointer 7 is at the position of the master's data forwarding pointer 10 (naturally taking into account the propagation time over the network), and ideally the data output pointer 6 is at the same location as the master.

Typically, to avoid data losses or to allow any "pulling" which may be required, the ring buffer on the slaves should be larger than those on the master. As an additional note, it is also possible to ascertain the position of the current byte sent to the codec by the master indirectly using the state of the ring buffer. If the ring buffers in the master and the slave are full to the same extent, the synchronization is correct. If the ring buffer of a slave is less full or fuller than those of the master, this indicates the corresponding shift in the output.

Retry Protocol (Correction Mechanism):

The slave can easily establish whether a data packet has been lost. This is the case precisely when a new data packet is received whose first byte does not have a consecutive address (data gap).

When a data packet is lost, this typically occurs on the network and normally for a plurality of or all of the slaves in the "channel". To avoid unnecessary loading of the network, an intelligent retry method is used. All of the slaves receive the "new" data packet at approximately the same time and are therefore able to establish approximately simultaneously that data have been lost. Each client now delays an individual time (derived from the IP address or MAC address under random control or by means of an algorithm), in the range of 1 to, by way of example, 30 ms, before it transmits a "retry request". This retry request is then sent by broadcast to the UDP port which is specific to the "channel", and can thus be received by all of the stations which are connected to the channel—not just by the master. While the clients wishing to initiate a retry wait for the individual time, reception of UDP datagrams is continued. A retry initiated by another client ends the waiting and prevents the client's own retry from being sent if it is the same (the same first byte address which is not present) or is a request for even more data—this effectively prevents multiple identical retry requests and minimizes the load on the network.

If a slave establishes that the loss of data can no longer be compensated for within the available time anyway by the master using a resend, it ends its retry requests. This makes it possible to prevent unnecessary retry requests, which only encumber the network without subsequently benefiting the slave, from continuing to be sent. A slave can then play back either up to the last available byte and then resynchronize to the data stream, or—which may be entirely appropriate particularly in the case of short intervals with a data loss—it interrupts reproduction within the window whose data are not available.

When a retry arrives, the master waits for a particular time (e.g. 30 ms, the same as the maximum client delay plus max. internal processing time for incoming data blocks) before starting to repeat the transmission. This delay means that it is possible to prevent a retry from being started from a particular point onward but then another retry request arriving at an earlier point.

In principle, all data from a requested point up to the end of the master streaming buffer are repeated.

Slaves ignore all incoming data which they already "know", this being done not on a block-specific basis but rather on a "byte-specific" basis—a retry block may contain some old and some new data.

Resynchronization:

It may be that a slave has not received any data for a relatively long time as a result of massive reception interference and therefore produces an "underrun", i.e. the streaming buffer becomes empty. In this case, no more retries are requested, but rather the slave resynchronizes itself from the very beginning in line with the method described. In this case, output of the media stream needs to be interrupted on the slave for a short period.

Synchronizing to a Running Data Stream:

Slaves can synchronize to a running data stream at any time, they do not need to start in sync. This is done using the following method:

1) The slave fills the streaming buffer with the data transmitted on the channel
2) The slave tracks the addresses of the currently output bytes, which addresses are sent by the master concurrently in the broadcasts
3) The slave may additionally use specific requests to learn from the master which byte (address) it has just output to the codec.
4) The address of the first byte written to the streaming buffer is compared with the current output address sent by the master. If these are the same or if the master has already output more data, reproduction is started immediately.

Fine Alignment:

Regular requests to the master (in similar fashion to time synchronization, implemented in the same data blocks as the time synchronization) make it possible to establish whether the client is more "behind" or "ahead of" the master, specifically in very simple fashion by forming the difference between the byte addresses which are currently being output to the codec. These data naturally need to be averaged over time.

If the client is already ahead of the master in the streaming buffer, the codec can be slowed down somewhat by slowing down the clock frequency slightly until precise synchronization has been achieved. In similar fashion, the codec clock frequency is raised slightly if the client is behind the master on average.

Ending the Master Mode:

The master can check the need to transmit data—that is to say the master role—by virtue of there being activity from slaves, at least for time synchronization. If there is no further client activity recorded over a relatively long period of time (at least 3× requesting interval for time synchronization) then

List of Reference Symbols

1 Reproduction unit (master)
2 Reproduction unit (slave)
3 Data server
4 Network
5 Ring buffer for data
6 Data output pointer (slave/master)
7 Data input pointer (slave)
8 Data input pointer (master)
9 Stock of data
10 Data forwarding pointer (master)
11 Safety area
12 Data packet for slaves
13 Loudspeaker

The invention claimed is:

1. A method for reproducing data streams or data packets transmitted via at least one network using at least two reproduction units that are at least indirectly linked to the network, the method comprising:
   transmitting data packets between the at least two reproduction units asynchronously;
   buffering data packets in the at least two reproduction units dynamically so as to be matched to the circumstances of the network;
   synchronizing reproduction using the at least two reproduction units, wherein the reproduction units are synchronized in a range below 100 ms,
   either by virtue of one of the reproduction units, as a master, prescribing its internal clock as a reference and at least one other reproduction unit, as a slave, aligning its internal clock with that of the master via the network or carrying a copy of the master clock and reproducing data streams or data packets based on this aligned clock,
   or by virtue of the internal clock of an external unit available on the network being used as the master and all reproduction units, as slaves, aligning their internal clocks with that of the master via the network and reproducing data streams or data packets based on this aligned clock,
   wherein at least some of the data streams or data packets are temporarily buffered in the reproduction units before reproduction, with audio files involving buffering in a range of approximately 1 to 5 sec; and
   aligning the clock on each slave before reproduction for the first time and updating the clock periodically during the reproduction, the periodic update being performed on the slave for systematically matching the speed of operation of the internal clock in the slave to that of the master in order to compensate for differences in the internal propagation-time characteristics of the master and the slave,
   wherein the internal clock in the slave is aligned by virtue of the internal clock in the master being requested by the slave, a plurality of times, and by virtue of at least one data packet, that may be identical to the packets for requesting the time on the master, being transmitted from the slave to the master and being sent back, and the internal clock in the slave being brought into line with the clock in the master on the basis of a mean propagation time, calculated as a mean taking into account handling times in the units, for data packets between the master and the slave.

2. The method as claimed in claim 1, wherein a first of the reproduction units that has a task of reproduction is automatically defined as the master.

3. The method as claimed in claim 1, wherein the data streams or data packets are at least one of digital audio, video data, a combination of digital audio or video data, compressed or uncompressed audio files of MP3, WAV, MPEG, or Windows Media.

4. The method as claimed in claim 3, wherein either same data are reproduced on the reproduction units or different channels of the data, in a case audio files in stereo format or multichannel, are reproduced on different reproduction units.

5. The method as claimed in claim 1, wherein the individual reproduction units are synchronized in a range of at least one of below 10 ms, or below 2 ms, or below 1 ms.

6. The method as claimed in claim 1, wherein the network is a wireless network or a radio network.

7. The method as claimed in claim 1, wherein during the reproduction by at least one reproduction unit at least one further reproduction unit is switched in synchronously by virtue of the unit that has been switched in automatically aligning itself with the present master and starting reproduction itself after buffering some of the data.

8. The method as claimed in claim 1, wherein the data packets or data streams are either fetched from a separate data server, or are fetched on one of the reproduction units, or are already available on the reproduction units, or are made available to the system in digital form via an analog/digital converter and/or a compression/coding unit after supply in analog or digital form.

9. The method as claimed in claim 1, wherein the data packets or data streams are read from a data source into a ring buffer in the master, with each byte read in being provided with a unique address, and wherein, in a process that is independent of the data streams being read into the ring buffer, the master sends the data to the network from the ring buffer in blocks, straight after reading in, by broadcast, or by UDP broadcast, or by multicast, with an addition of a protocol header that includes an address of a first byte sent, a precise master time, and an address of the next byte that is to be sent by the master to a codec of the master.

10. The method as claimed in claim 9, wherein the address of the next byte that is to be sent by the master to the codec of the master is sent at least partly in independent control blocks, which may be identical to control blocks for checking the clock on the master.

11. The method as claimed in claim 1, further comprising:
   sending a lost data portion again, to protect data integrity when a slave establishes that a data portion has been lost on the network, by the master upon a request from the slave, with the master performing this repeated sending only after a delay, and with the slaves making the requests in staggered fashion such that identical requests are sent only once over the network.

12. The method as claimed in claim 1, wherein the data streams or data packets are used to send a bit rate of the master at which the master provides the data streams or data packets on the network, the reproduction unit using the sent bit rate to ascertain the delays that arise in the network.

13. The method as claimed in claim 1, wherein at least one of the reproduction units has a memory that is used as a source of audio data, content of the audio data being obtained from the master or from another data source.

14. A method for reproducing data streams or data packets transmitted via at least one network using at least two reproduction units which are at least indirectly linked to the network, the method comprising:

synchronizing reproduction using the at least two reproduction units, either by virtue of one of the reproduction units, as master, prescribing an internal clock of the master as reference and the other reproduction units, as slaves, aligning internal clocks of slaves with that of the master via the network or carrying a copy of the master clock and reproducing data streams or data packets on the basis of this aligned clock, or by virtue of the internal clock of an external unit which is likewise available on the network being used as the master and all reproduction units, as slaves, aligning their internal clock with that of the master via the network and reproducing data streams or data packets on the basis of this aligned clock, wherein the data streams or data packets are used to send at least one command to the reproduction units together with an associated execution time, the execution time being set to a time between the transfer of the command to the network and the execution time which is greater than a longest network delay time between the master and the slaves.

15. The method as claimed in claim 14, wherein the network is a network in which data packets are transmitted asynchronously or synchronously.

16. The method as claimed in claim 14 further comprising:
aligning the clock of the slave before reproduction for a first time; and
updating the clock periodically during the reproduction.

17. The method as claimed in claim 14, wherein the periodic update is used on the slave for systematically matching a speed of operation of the internal clock in the slave to that of the master to compensate for differences in internal propagation-time characteristics of the master and slave.

18. The method as claimed in claim 17, wherein the systematic matching involves scaling the internal clock in the slave using a constant correction factor.

19. The method as claimed in claim 14, wherein the internal clock is aligned by virtue of the internal clock in the master being requested by the slave, a plurality of times, and by virtue of at least one data packet that may be identical to the packets for requesting the time on the master, being transmitted from the slave to the master and being sent back, and the internal clock in the slave being brought into line with the clock in the master based on a propagation time or an average propagation time for data packets between master and slave.

20. The method as claimed in claim 14, wherein the propagation time is calculated as a mean taking into account handling times in the reproduction units.

21. The method as claimed in claim 14, further comprising:
buffering data packets in the at least two reproduction units dynamically so as to be matched to circumstances of the network.

22. A method for reproducing data streams or data packets transmitted via at least one network using at least two reproduction units which are at least indirectly linked to the network, the method comprising:

synchronizing reproduction using the at least two reproduction units, either by virtue of one of the reproduction units, as master, prescribing an internal clock of the master as a reference and the other reproduction units, as slaves, aligning internal clock of the slaves with that of the master via network or carrying a copy of the master clock and reproducing data streams or data packets on the basis of this aligned clock, or by virtue of the internal clock of an external unit, which is likewise available on the network being used as the master and all reproduction units, as slaves, aligning their internal clock with that of the master via the network and reproducing data stream or data packets on the basis of this aligned clock, wherein a reproduction unit that has been switched in transfers the data streams or data packets received from the network directly to a codec, the codec rejects the supplied data by muting until the codec detects a first valid frame, the codec is stopped when the codec detects the first valid frame and the current byte is noted, and the codec is the reproduction unit processes the data stream or the data packets again and is switched to reproduction when this current byte is played on the master, after the codec is stopped and the current byte is noted.

23. The method as claimed in claim 1, wherein at least one of the reproduction units is for its part used as a master for a subnetwork, with appropriate repetitions being forwarded to a topmost master.

24. A non-transitory computer readable medium containing program instructions for execution on a computer which when executed by a processor causes the computer to perform the method comprising:

transmitting data packets between the at least two reproduction units asynchronously;

buffering data packets in the at least two reproduction units dynamically so as to be matched to the circumstances of the network;

synchronizing reproduction using the at least two reproduction units, wherein the reproduction units are synchronized in a range below 100 ms, either by virtue of one of the reproduction units, as a master, prescribing its internal clock as a reference and at least one other reproduction unit, as a slave, aligning its internal clock with that of the master via the network or carrying a copy of the master clock and reproducing data streams or data packets based on this aligned clock, or by virtue of the internal clock of an external unit available on the network being used as the master and all reproduction units, as slaves, aligning their internal clocks with that of the master via the network and reproducing data streams or data packets based on this aligned clock, wherein at least some of the data streams or data packets are temporarily buffered in the reproduction units before reproduction, with audio files involving buffering in a range of approximately 1 to 5 sec; and aligning the clock on each slave before reproduction for the first time and updating the clock periodically during the reproduction, the periodic update being performed on the slave for systematically matching the speed of operation of the internal clock in the slave to that of the master in order to compensate for differences in the internal propagation-time characteristics of the master and the slave, wherein the internal clock in the slave is aligned by virtue of the internal clock in the master being requested by the slave, a plurality of times, and by virtue of at least one data packet, that may be identical to the packets for requesting the time on the master, being transmitted from the slave to the master and being sent back, and the internal clock in the slave being brought into line with the clock in the master on the basis of a mean propagation time, calculated as a mean taking into account handling times in the units, for data packets between the master and the slave.

25. A reproduction unit configured to reproduce data streams or data packets via an output unit transmitted via at least one network, in which data packets are transmitted asynchronously, using at least two reproduction units which are at least indirectly linked to the network via a network interface, comprising:

The network interface configured to indirectly link the reproduction unit to at least one additional reproduction unit over the network;

A central computer unit configured to automatically integrate the reproduction unit into the network, and including a memory storing a permanently programmed data processing program that is activated automatically after a power supply is turned on, the central computer unit being configured to synchronize reproduction of the data stream or data packets with the at least one additional reproduction unit, the reproduction time difference between the reproduction unit and the at least one additional reproduction unit being 100 ms, either by virtue of one of the reproduction units, as a master, prescribing an internal clock of the master as a reference and at least one other reproduction unit as a slave, aligning an internal clock of the slave with that of the master via the network or carrying a copy of the master clock, and reproducing the data streams or data packets based on this aligned clock, or by virtue of the internal clock of an external unit available on the network being used as the master and all reproduction units, as slaves, aligning their internal clocks with that of the master via the network and reproducing the data streams or data packets based on this aligned clock; and the output unit to at least indirectly output the data streams or data packets, wherein at least some of the data streams or data packets are temporarily buffered in the reproduction units before reproduction, with audio files involving buffering in the range of approximately 1to 5sec, the buffering being performed dynamically so as to be matched to the circumstances of the network, the clock on each slave is aligned before reproduction for the first time and is updated periodically during the reproduction, the periodic update being used on the slave for systematically matching the speed of operation of the internal clock in the slave to that of the master in order to compensate for differences in the internal propagation-time characteristics of the master and the slave, and the internal clock in the slave is aligned by virtue of the internal clock in the master being requested by the slave, a plurality of times, and by virtue of at least one data packet, that may be identical to the packets for requesting the time on the master, being transmitted from the slave to the master and being sent back, and the internal clock in the slave being brought into line with the clock in the master on the basis of a mean propagation time, calculated as a mean taking into account handling times in the units, for data packets between the master and the slave.

* * * * *